June 4, 1963 R. S. MACRAE 3,091,996
MARKERS FOR ROADS
Filed Oct. 28, 1959 2 Sheets-Sheet 1

INVENTOR
Robert S. Macrae
BY
Albert Jacobs
ATTORNEY

June 4, 1963   R. S. MACRAE   3,091,996
MARKERS FOR ROADS
Filed Oct. 28, 1959
2 Sheets-Sheet 2

INVENTOR
Robert S. Macrae
BY Albert H. Jacobus
ATTORNEY

United States Patent Office 3,091,996
Patented June 4, 1963

3,091,996
MARKERS FOR ROADS
Robert Stuart Macrae, London, England, assignor of one-half to Garringtons Limited, Stafford, England, a British company, and one-half to Gydelite Limited, London, England, a British company
Filed Oct. 28, 1959, Ser. No. 849,342
Claims priority, application Great Britain Oct. 30, 1958
1 Claim. (Cl. 94—1.5)

This invention relates to a marker for roads and is concerned with a marker of the type having a generally dome-shaped head, the underside of which, or part of the underside of which, in use engages the road surface, and, extending downwardly from the head, anchoring means adopted for insertion in a prepared hole in the road and including expanding means whereby parts of the anchoring means can be laterally expanded or held in expanded positions to engage the sides of the prepared hole and thus anchor the marker in place.

Markers of the type specified above can be used on ordinary vehicle roads and also on aircraft landing strips and railway permanent ways, and the expression "road" as used herein is intended to be taken as including any such other applications of markers of the type specified.

For example, such anchoring means may comprise a rubber sleeve through which passes a fixing bolt which also passes through a hole in the head of the marker, such bolt having engagement with a nut which may be bonded to the lower end of the rubber sleeve or otherwise prevented from turning with respect to the rubber sleeve. The assembly of head bolt, sleeve and nut is engaged with the hole in the road, the sleeve being a good fit in the hole and when the bolt is tightened, the nut which is prevented from rotating, will move axially upon the thread of the bolt and in so doing will compress the rubber sleeve and cause it to expand to grip the bore of the hole. An alternative form of anchoring means comprises a split metal sleeve or number of metal segments which can be forced apart by a nut member engageable with the thread of a bolt which passes through a hole in the head of the marker. The above are examples of types of anchoring means and other types may be used which are expanded by a separate tool in the hole in the road to form a fixed anchorage prior to attachment of the head of the marker to the anchoring means.

The head of the marker may be provided with suitable reflecting lenses and such markers are capable of use not only in roads which take wheeled traffic but also in other places such as aircraft runways or on railway tracks where markers and particularly reflecting markers find use to define some particular path or act as a warning system.

In practice it has been found that the use of known types of anchoring means for anchoring the marker in position in which the parts of the anchoring means which are laterally expanded act upon substantially the full length of the prepared hole has a certain drawback in that there is a tendency for the anchoring means to expand the prepared hole in the road surface, and this occurs particularly in a bituminous road, particularly in hot weather when the road surface may be softened and where the considerable pressure exerted by the anchoring means can enlarge the diameter of the hole throughout its entire depth with the result that the marker is loosened and may become completely dislodged from the hole in the road.

Also in such methods of fixing where the anchoring means occupies the whole length of the shank member, it has been found that a fixing bolt which extends through the head of the marker is subject to heavy loads, such as pounding from vehicle wheels and is liable to bending or shearing at the plane of the road level. A further point in connection with such markers is that means must be provided to prevent the marker being rotated about the axis of the bolt, due to pounding from vehicle wheels and in prior proposals this accidental rotation has been prevented by the provision of projections on the underside of the head of the marker which do, however, necessitate the provision of corresponding recesses in the road surface.

The object of the present invention is to provide an improved road marker of the type referred to with a view to eliminating the above mentioned disadvantages.

According to the present invention, in a road marker of the type specified, the anchoring means include a nut member and the expanding means include a bolt which extends downwardly through the head of the marker and engages the nut member, which is disposed below the head, the underside of the head is provided with an integrally formed boss which projects downwardly therefrom, this boss having an opening extending therethrough through which the bolt extends, a portion at least of the boss being of non-circular transverse cross section so as to prevent rotation of the marker about the axis of the bolt when the boss is located within a suitable hole in the road, and the lower end of the boss being adapted to act as an abutment means for upper ends of one or more anchoring members forming part of the anchoring means and acted upon at or near their lower ends by the nut member upon appropriate rotation of the bolt to move outwardly away from the axis of the bolt to engage the walls of the hole in the road, and thereby to anchor the marker in position, whereby in use the part of the prepared hole in the road on which the anchoring means act is remote from the surface of the road.

Since in practice it is the part of the prepared hole adjacent the road surface which tends to become enlarged by the forces set up upon the marker by passing vehicles, and it is this part of the wall of the prepared hole which, in the case of a bituminous road, becomes softened in hot weather, the use of anchoring members which act only on the walls of the part of the prepared hole which is remote from the surface of the road effects a considerable reduction in the tendency for the marker to become loosened in the prepared hole while in use.

In the accompanying drawings a preferred embodiment of expanding means for fixing road markers in accordance with the invention is illustrated and wherein.

Figure 1:
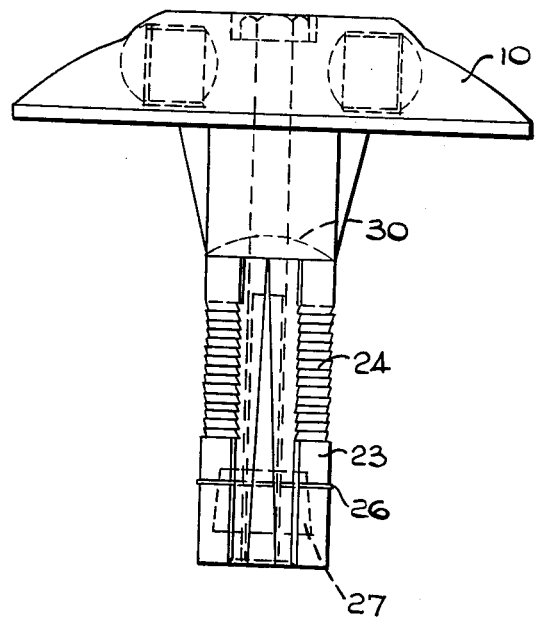
FIGURE 1 is a side elevation of a road marker having expanding means for anchorage.
Figure 2:
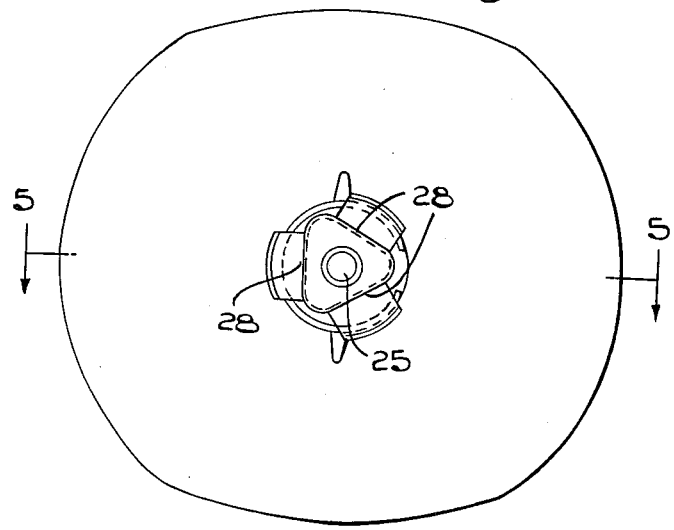
FIGURE 2 is a plan view from below on FIGURE 1.
Figure 3:
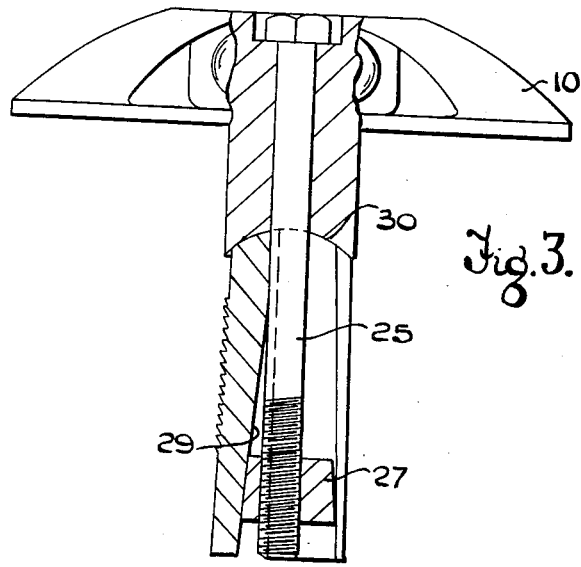
FIGURE 3 is a part-section on the lines 5—5 of FIGURE 2.

The anchoring means comprise a number of toothed segments, conveniently three as shown, each segment 23 being provided on its outer surface with a series of teeth 24 formed with flat faces presented in a direction of the head of the marker and assembled around the axis of the fixing bolt 25 where they are held loosely in position by means of a split ring 26.

Threaded upon the lower end of the bolt 25 is an expanding nut 27 which, as shown in FIGURE 4, is of substantially triangular cross-section so as to provide three flat faces 28, each of which engages the inner face 29 of one of the toothed segments. Also the nut 27 is of substantial frustro-pyramidal form, so that it acts as a wedge in co-operation with the inner faces 29 of the toothed segments and it will be observed in FIGURE 5 that the inner face 29 of each toothed segment is of tapering form, the maximum width of the segment being adjacent the lower end thereof.

Also the upper end of each segment is of outwardly curved form and the lower end of the boss on the head of the marker is provided with a concave depression 30 in which are seated the upper ends of the toothed segments.

In the assembled state shown in FIGURE 1 the marker is ready for insertion into a prepared hole in the road, so as to engage the underside of its head with the surface of the road and thereafter upon rotation of the fixing bolt 25 the nut 27 will be caused to advance axially up the bolt as it is prevented from rotation by virtue of its engagement with the faces of the toothed segments, which are themselves prevented from rotating by virtue of engagement with the wall of the hole. Such axial movement of the wedge nut 27 will cause the lower ends of the toothed segments to move outwardly away from the shank of the bolt whilst the upper ends perform a rocking movement in the concave depression 30 in the end of the boss, so that the toothed portions of the segments engage and bite into the wall of the hole to form a firm anchorage while the end face 30 of the boss acts as the abutment means which in co-operation with the movement of the nut 27 causes the outward expanding movement of the toothed segments 23.

In the above described construction the radial ribs 19 act to prevent any accidental rotation of the marker when in position which might be brought about by pounding from vehicle wheels and the presence of the ribs 19 does not entail having to provide any further recesses in the road surface because either a circular hole may be used in the road with the ribs 19 making their own recesses or recesses may be provided by means of the same tool that provides the prepared hole in the road.

In the event of any expansion of the wall of the hole due to the circumstances mentioned hereinbefore this will take place only over the depth of the hole corresponding to the overall axial length of the expanding means which will be the length of the toothed segments 23.

Hence no expansion of the upper portion of the hole which surrounds the boss 15 will take place and the possibility of the marker accidentally coming out of the hole is eliminated.

It will be further observed that the provision of the boss 15 eliminates or substantially reduces the possibility of the fixing bolt being sheared or bent due to pounding loads from vehicle wheels as any shear forces acting at the road level are now distributed over the cross-section of the boss so that shear forces on the bolt at this position are greatly reduced and likewise bending forces upon the bolt shank at this position are greatly reduced.

What I claim then is:

A road marker comprising:

(a) A generally dome-shaped head formed with a central opening therethrough and a recess in the upper surface of the head around the upper end of the central opening, the head having a substantially planar underside adapted to engage the road surface when the marker is in operative position on the road;

(b) A generally cylindrical boss extending downwardly below the underside of the head to an extent sufficient to permit the boss, when the marker is in operative position, to enter a prepared hole formed in the road, the boss having an axial passage therethrough registering with the opening in the head;

(c) Elements on said boss preventing rotation of the marker when the latter is in operative position on the road, the lower edge of the boss forming an abutment having a concave depression and the adjacent segment ends being rounded and rockably engaging the depression;

(d) A plurality of segments provided with external teeth and mounted loosely over the underlying portion of the bolt, said nut moving axially of the bolt upon rotation of the bolt to effect displacement of lower parts of the segments outwardly away from the bolt axis comprising anchoring means in alignment with said boss having its upper end in contact with said abutment and an axial passage aligned with the axial passage of the boss;

(e) Expanding means whereby parts of the anchoring means can be laterally expanded to engage the sides of the prepared hole in the road, said expanding means comprising a bolt extending through said opening and passages having a head disposed in said recess, and a nut cooperating with the bolt and the anchoring means and adapted, upon rotation of the bolt in one sense to effect lateral expansion of the anchoring means.

References Cited in the file of this patent

UNITED STATES PATENTS

| | | |
|---|---|---|
| 1,412,581 | Tomkinson | Apr. 11, 1922 |
| 1,683,121 | Baldwin | Sept. 4, 1928 |
| 1,797,498 | Finley | Mar. 24, 1931 |
| 1,816,502 | Theel | July 28, 1931 |
| 1,905,612 | Wagner | Apr. 25, 1933 |
| 1,999,077 | Benedetto | Apr. 23, 1935 |
| 2,033,100 | Kellogg | Mar. 3, 1936 |
| 2,127,037 | La Croix | Aug. 16, 1938 |
| 2,154,966 | Vanderveer | Apr. 18, 1939 |
| 2,642,768 | Ogburn | June 23, 1953 |

FOREIGN PATENTS

| | | |
|---|---|---|
| 856,604 | Germany | Nov. 24, 1952 |
| 515,842 | Belgium | Dec. 15, 1952 |
| 1,106,531 | France | July 20, 1955 |
| 761,922 | Great Britain | Nov. 21, 1956 |